(12) United States Patent
Bershadsky et al.

(10) Patent No.: US 7,907,090 B2
(45) Date of Patent: Mar. 15, 2011

(54) CERAMIC DIELECTRIC FORMULATION FOR BROAD BAND UHF ANTENNA

(75) Inventors: Eli Bershadsky, Haifa (IL); Marina Kravchik, Haifa (IL); Reuven Katraro, Rishon Lezion (IL); David Ben-Bassat, Yahud (IL); Dani Alon, Hod Hasharon (IL)

(73) Assignee: Vishay Intertechnology, Inc., Malvern, PA (US)

( * ) Notice: Subject to any disclaimer, the term of this patent is extended or adjusted under 35 U.S.C. 154(b) by 612 days.

(21) Appl. No.: 11/759,523

(22) Filed: Jun. 7, 2007

(65) Prior Publication Data

US 2008/0303720 A1    Dec. 11, 2008

(51) Int. Cl.
*H01Q 1/24* (2006.01)

(52) U.S. Cl. ............... 343/700 MS; 343/778; 501/137; 501/139

(58) Field of Classification Search .......... 501/137, 501/138, 139; 343/700 MS, 778
See application file for complete search history.

(56) References Cited

U.S. PATENT DOCUMENTS

| | | | | |
|---|---|---|---|---|
| 3,732,117 A * | 5/1973 | Nitta et al. | ..................... | 501/137 |
| 3,788,867 A * | 1/1974 | Rutt | ..................... | 501/137 |
| 4,119,554 A * | 10/1978 | Fujiwara | ..................... | 501/135 |
| 4,396,721 A * | 8/1983 | Lawless | ..................... | 501/10 |
| 4,442,220 A | 4/1984 | Ouchi et al. | | |
| 4,820,670 A * | 4/1989 | Sano et al. | ..................... | 501/136 |
| 5,077,247 A | 12/1991 | Sato et al. | | |
| 5,312,790 A | 5/1994 | Sengupta et al. | | |
| 5,569,632 A | 10/1996 | Jung et al. | | |
| 5,635,434 A | 6/1997 | Sengupta | | |
| 5,693,429 A | 12/1997 | Sengupta et al. | | |
| 5,840,642 A | 11/1998 | Kim et al. | | |
| 5,854,608 A * | 12/1998 | Leisten | ..................... | 343/895 |
| 6,331,499 B1 | 12/2001 | Shimada et al. | | |
| 6,887,812 B2 | 5/2005 | Nenasheva et al. | | |
| 7,270,845 B2 * | 9/2007 | Japp et al. | ..................... | 427/97.5 |

(Continued)

FOREIGN PATENT DOCUMENTS

CN    1519216    8/2004

(Continued)

OTHER PUBLICATIONS

PCT/US2007/013442, Vishay Intertechnology, Inc., International Search Report, Jul. 6, 2007, 4 pages.

(Continued)

*Primary Examiner* — Tho G Phan
(74) *Attorney, Agent, or Firm* — Volpe and Koenig, PC

(57) ABSTRACT

A dielectric ceramic composition has a dielectric constant, K, of at least 200 and a dielectric loss, DF, of 0.0006 or less at 1 MHz. The dielectric ceramic composition may be formed by sintering by firing in air without a controlled atmosphere. The dielectric ceramic composition may have a major component of 92.49 to 97.5 wt. % containing 60.15 to 68.2 wt. % strontium titanate, 11.02 to 23.59 wt. % calcium titanate and 7.11 to 21.32 wt. % barium titanate; and a minor component of 2.50 to 7.51 wt. % containing 1.18 to 3.55 wt. % calcium zirconate, 0.50 to 1.54 wt. % bismuth trioxide, 0.2 to 0.59 wt. % zirconia, 0.02 to 0.07 wt. % manganese dioxide, 0.12 to 0.35 wt. % zinc oxide, 0.12 to 0.35 wt. % lead-free glass frit, 0.24 to 0.71 wt. % kaolin clay and 0.12 to 0.35 wt. % cerium oxide. UHF antennas and monolithic ceramic components may use the dielectric ceramic composition.

22 Claims, 2 Drawing Sheets

U.S. PATENT DOCUMENTS

2008/0305750 A1* 12/2008 Alon et al. .................. 455/77

FOREIGN PATENT DOCUMENTS

| JP | 79040760 B | * | 12/1979 |
| JP | 3183657 A2 | | 8/1991 |
| JP | 3192606 A2 | | 8/1991 |
| KR | 20040051732 | | 6/2004 |
| RU | 2167842 C1 | | 5/2001 |
| WO | WO 94/29925 A | | 12/1994 |
| WO | WO9721642 | | 6/1997 |
| WO | WO9803446 | | 1/1998 |
| WO | WO 02/059059 A2 | | 8/2002 |

OTHER PUBLICATIONS

Wieland, Ken "Exclusive: Mobile TV Antenna Breakthrough", Telecommunications Online, May 1, 2007, p. 1-2.

* cited by examiner

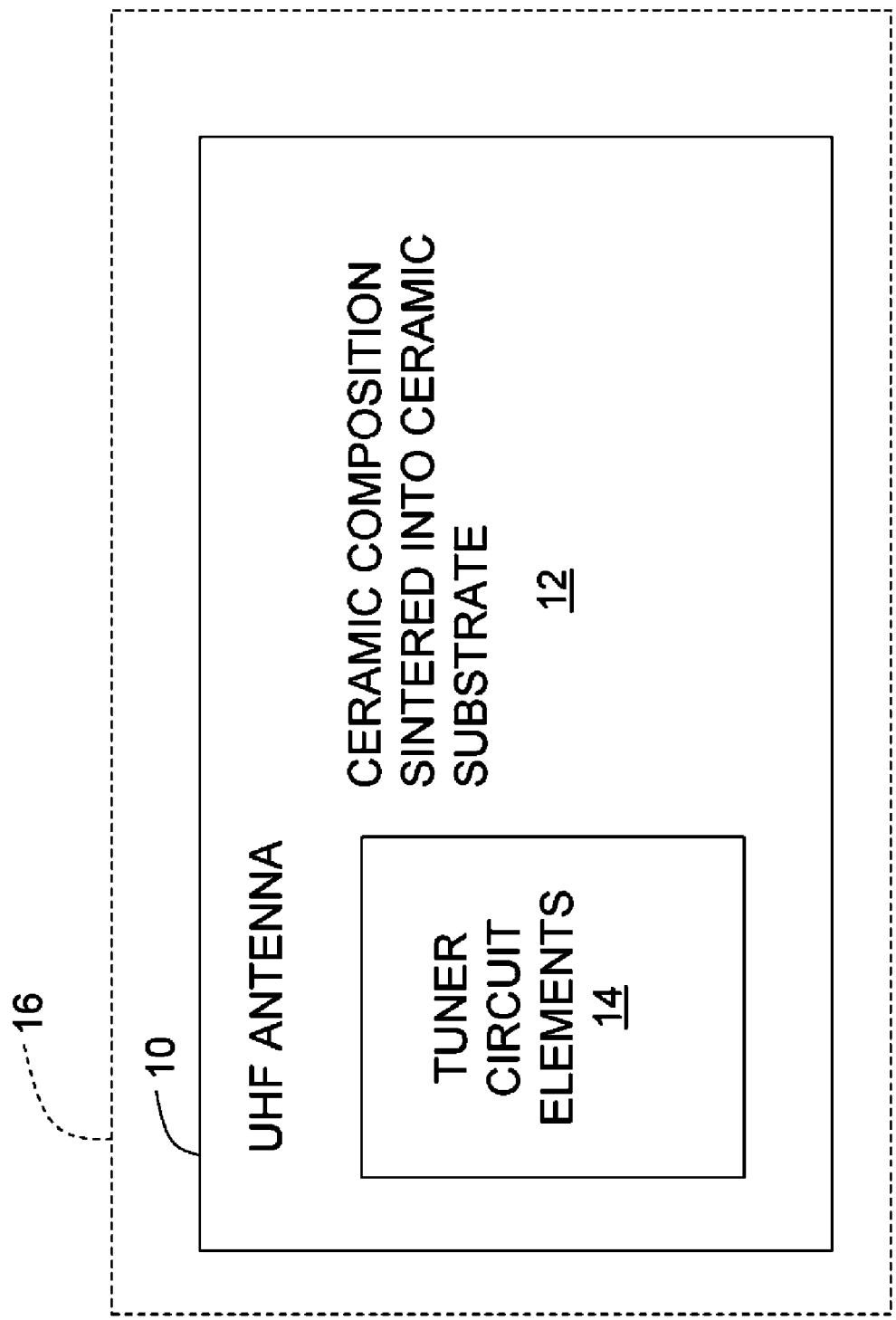

CERAMIC DIELECTRIC FORMULATION FOR BROAD BAND UHF ANTENNA

BACKGROUND OF THE INVENTION

The present invention relates to a dielectric ceramic material. More particularly, the present invention relates to a dielectric ceramic material with properties suitable for use in applications such as UHF antennas where a proper combination of dielectric constant and loss factor is desirable.

Several different dielectric ceramic systems are of potential use in antennas for RF and Microwave Frequencies. The advantage of using dielectrics in microwave devices is size reduction of the antenna, which is due to the phenomenon that the length of electromagnetic wave in a medium is inversely proportional to square root of its dielectric constant ($\lambda \sim 1/\sqrt{K}$). The dielectric constant of most commercial microwave materials varies from ~10 to 30-40 to 80-100 with maximal ten-fold size reduction of antenna or resonator being achieved in the latter case. Part of such materials are described in patents: U.S. Pat. No. 5,840,642 to Kim et al., U.S. Pat. No. 5,569,632 to Jung et al., KR20040051732, CN1519216, RU2167842; PCT published patent application WO9721642 to Suvorov et al.; JP3192606, JP3183657; U.S. Pat. No. 4,442,220 to Ouchi et al., all of which are herein incorporated by reference in their entirety.

However, even ten-fold size reduction is not sufficient for devices in the UHF domain (470 MHz to 870 MHz) where wavelength ranges from about 30 to 60 cm, which requires significant increase in dielectric constant of material. Materials with much higher dielectric constant (>1000) are based on ferroelectric systems, thus characterized by high dielectric losses and significant frequency dependence of properties at UHF. In order to form a viable UHF antenna a dielectric must have the correct combination of dielectric constant and loss factor to allow for the miniaturization of the antenna over the desired UHF frequency range 450 MHz to 900 MHz when combined with other components in the final antenna configuration. Dielectric ceramic with K in the range of 250 to 380, based on the $Ag(Nb,Ta)O_3$ system is described in PCT published patent application WO9803446 to Valant et al., however these materials are very expensive, require oxygen atmosphere at sintering and exhibit relatively high dielectric losses at UHF.

What is needed is an improved dielectric material for use in UHF antennas and/or other applications.

Therefore, it is a primary object, feature, or advantage of the present invention to improve over the state of the art.

It is a further object, feature, or advantage of the present invention to provide an improved dielectric material suitable for use in UHF antennas.

A still further object, feature, or advantage of the present invention is to provide a ceramic dielectric material that does not require special atmosphere control during sintering.

Another object, feature, or advantage of the present invention is to provide a ceramic dielectric material that does not use expensive metals such as silver, niobium or tantalum.

Yet another object, feature, or advantage of the present invention is to provide a ceramic dielectric material that has a relatively high dielectric constant and a low dielectric loss.

One or more of these and/or other objects, features, or advantages of the present invention will become apparent from the specification and claims that follow.

BRIEF SUMMARY OF THE INVENTION

A dielectric ceramic composition has a dielectric constant, K, of at least 200 and a dielectric loss, DF, of 0.0006 or less at 1 MHz. The dielectric ceramic composition may be formed by sintering by firing in air without a controlled atmosphere. The dielectric ceramic composition may have a major component of 92.49 to 97.5 wt. % containing 60.15 to 68.2 wt. % strontium titanate, 11.02 to 23.59 wt. % calcium titanate and 7.11 to 21.32 wt. % barium titanate; and a minor component of 2.50 to 7.51 wt. % containing 1.18 to 3.55 wt. % calcium zirconate, 0.50 to 1.54 wt. % bismuth trioxide, 0.2 to 0.59 wt. % zirconia, 0.02 to 0.07 wt. % manganese dioxide, 0.12 to 0.35 wt. % zinc oxide, 0.12 to 0.35 wt. % lead-free glass frit, 0.24 to 0.71 wt. % kaolin clay and 0.12 to 0.35 wt. % cerium oxide. The dielectric ceramic composition may be used in a broad band UHF antenna, in dielectric resonators, electrical filters, substrates, monolithic ceramic components, or otherwise.

A method of manufacturing includes providing a ceramic dielectric material consisting essentially of a major component of 92.49 to 97.5 wt. % containing 60.15 to 68.2 wt. % strontium titanate, 11.02 to 23.59 wt. % calcium titanate and 7.11 to 21.32 wt. % barium titanate, and a minor component of 2.50 to 7.51 wt. % containing 1.18 to 3.55 wt. % calcium zirconate, 0.50 to 1.54 wt. % bismuth trioxide, 0.2 to 0.59 wt. % zirconia, 0.02 to 0.07 wt. % manganese dioxide, 0.12 to 0.35 wt. % zinc oxide, 0.12 to 0.35 wt. % lead-free glass frit, 0.24 to 0.71 wt. % kaolin clay and 0.12 to 0.35 wt. % cerium oxide. The method further includes firing the ceramic dielectric material.

BRIEF DESCRIPTION OF THE DRAWINGS

FIG. 2 is pictorial representation of one embodiment of a UHF antenna formed with a ceramic dielectric formulation.

DETAILED DESCRIPTION OF THE PREFERRED EMBODIMENT

Figure 1:
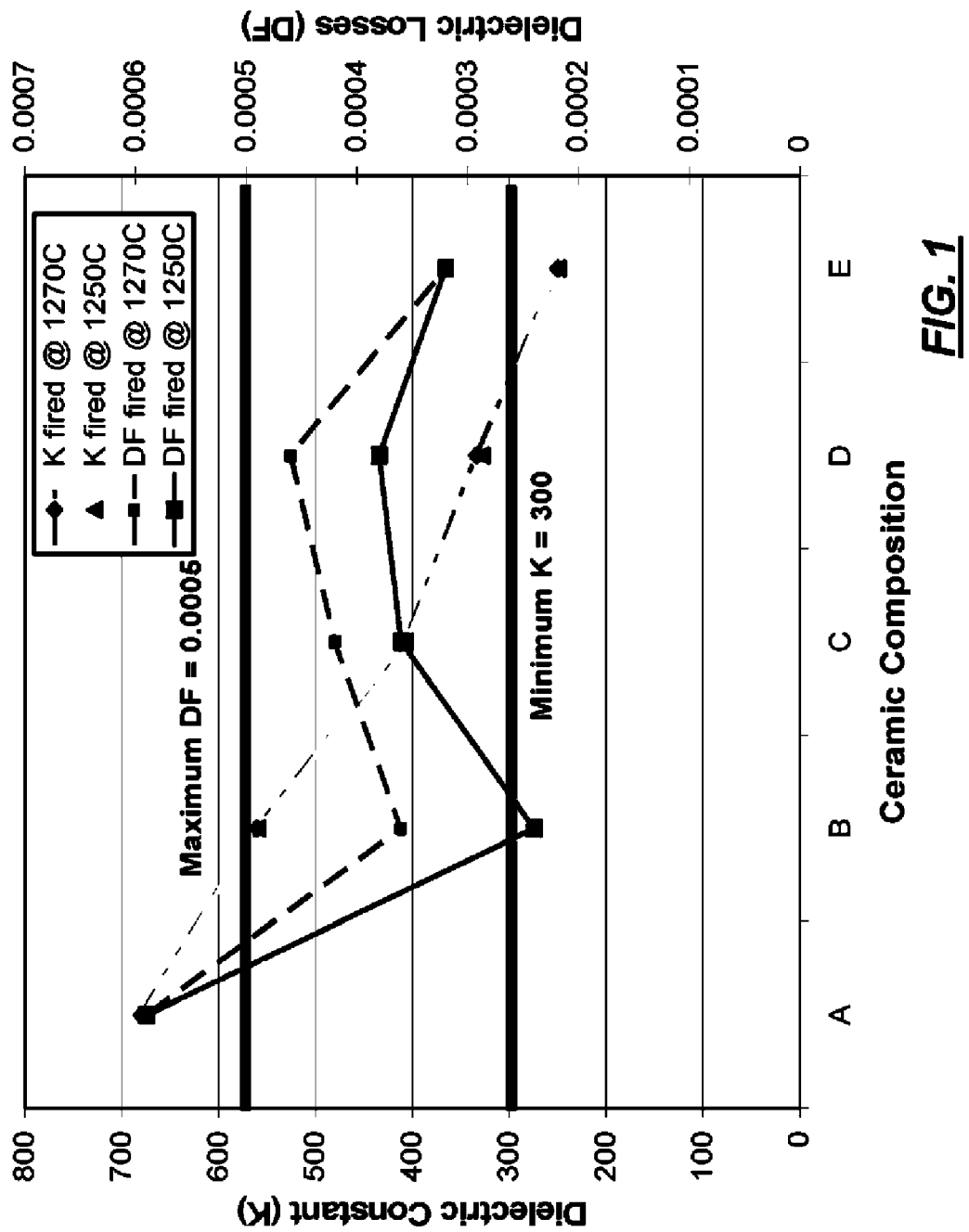
FIG. 1 is a chart illustrating dielectric constants and dielectric losses for different examples of the dielectric ceramic material.

The invention described herein provides a ceramic formulation that when sintered into a ceramic substrate provides a material with high dielectric constant (>200) and low losses; <0.00060 @ 1 MHz). When combined with tuner circuit elements this substrate is an effective broad band UHF antenna. Furthermore, unlike the $Ag(Nb,Ta)O_3$ system is described in PCT published patent application WO9803446 the invention herein does not require special atmosphere control during sintering nor does it use expensive metals such as silver, niobium or tantalum.

Following an extensive investigation of ceramic formulations in the $SrTiO_3$—$BaTiO_3$—$CaTiO_3$ system a range of formulations was identified with the correct combination of properties for UHF broadband antennas. The compositions investigated are described in Table 1 below:

TABLE 1

| | Ceramic Compositions. | | | | |
|---|---|---|---|---|---|
| Component | A wt % | B wt % | C wt % | D wt % | E wt % |
| Strontium titanate | 56.83 | 66.80 | 63.43 | 60.15 | 70.12 |
| Barium titanate | 28.42 | 7.11 | 14.21 | 21.32 | 0 |
| Calcium titanate | 4.73 | 23.59 | 17.31 | 11.02 | 29.88 |
| Calcium zirconate | 4.73 | 1.18 | 2.37 | 3.55 | 0 |
| Bismuth trioxide | 2.05 | 0.50 | 1.03 | 1.54 | 0 |
| Zirconia | 0.79 | 0.20 | 0.40 | 0.59 | 0 |

TABLE 1-continued

Ceramic Compositions.

| Component | A wt % | B wt % | C wt % | D wt % | E wt % |
|---|---|---|---|---|---|
| Manganese dioxide | 0.09 | 0.02 | 0.05 | 0.07 | 0 |
| Zinc oxide | 0.47 | 0.12 | 0.24 | 0.35 | 0 |
| Lead free Glass frit | 0.47 | 0.12 | 0.24 | 0.35 | 0 |
| Kaolin (Clay) | 0.95 | 0.24 | 0.48 | 0.71 | 0 |
| Cerium oxide | 0.47 | 0.12 | 0.24 | 0.35 | 0 |

These ceramic compositions were formulated into ceramic slips and cast into substrates by methods well known in the art. After removal of organics in a bakeout process the final sintering was performed in air at temperatures 1270° C. and 1250° C. respectively, although other temperatures may be used. The dielectric properties were measured at 1 MHz and are shown in Table 2.

TABLE 2

Dielectric properties at 1 MHz

| | Firing Temperature 1270° C. | | Firing Temperature 1250° C. | | TCC, ppm/° C. | |
|---|---|---|---|---|---|---|
| Composition | K | DF | K, | DF | @−40 to 20° C. | @20 to 85° C. |
| A | 680 | 0.00059 | 680 | 0.00059 | −−12000 | −5000 |
| B | 560.9 | 0.00036 | 560 | 0.00024 | −9300 | −4500 |
| C | 406.9 | 0.00042 | 407 | 0.00036 | −6600 | −3100 |
| D | 333.5 | 0.00046 | 328 | 0.00038 | −3900 | −2150 |
| E | 250 | 0.00032 | 250 | 0.00032 | −1200 | −1200 |

The dielectric constant (K) is very similar for the 2 different firing temperatures and there is a small variation in dielectric losses (DF). The temperature coefficient of capacitance (TCC) is similar for both firing temperatures. It is important to note that TCC for these compositions is very high compared to a Class 1 C0G multilayer capacitor formulation (±30 ppm/° C. in the temperature range −55° C. to +125° C.) or a narrow band microwave antennas. In the case of the multilayer capacitor or narrow band microwave antenna stable properties with temperature are required to prevent a drift out of specification with temperature fluctuations. However, since these ceramics are used in a UHF antenna over a broad frequency band, temperature stability is less critical so higher TCC can be tolerated.

In order to form miniaturize the antenna whilst retaining low losses dielectric constant has to be maximized while retaining low losses. FIG. 1 provides a chart illustrating dielectric constants and DF for the examples provided. By plotting the dielectric constants and DF reported in Table 2 it can be seen that only for dielectric formulations B, C and D is the dielectric constant above 300 with DF below 0.0005.

FIG. 2 is a pictorial representation of one embodiment of a UHF antenna formed with a ceramic dielectric formulation. The UHF antenna 10 includes a ceramic composition such as that previously described sintered into a ceramic substrate 12. The UHF antenna 10 further includes tuner circuit elements 14. The UHF antenna 10 is then incorporated into an electronic device 16.

The dielectric ceramic material may be used for other purposes in addition to use in UHF antennas. It may be used in dielectric resonators, filters, substrates for microelectronic circuits, or built-in to any number of types of electronic devices.

The present invention is not to be limited to the specific disclosure provided herein. The present invention contemplates variations in the formulation, the specific applications of the dielectric ceramic composition, the type of monolithic ceramic component incorporating the dielectric ceramic composition, the type of electronic device incorporating a UHF antenna, and other variations within the spirit and scope of the present invention.

What is claimed is:

1. A broad band UHF antenna comprised of a dielectric ceramic composition containing more than 50 wt. % of a non-ferroelectric material, the dielectric ceramic composition having a dielectric constant, K, of at least 200 and a dielectric loss, DF, of 0.0006 or less at 1 MHz.

2. The broad band UHF antenna of claim 1 wherein the dielectric ceramic composition is formed into a sintered body by firing.

3. The broad band UHF antenna of claim 1, wherein the dielectric ceramic composition has a dielectric constant, K, of at least 300 and a dielectric loss, DF, of 0.0005 or less at 1 MHz.

4. The broad band UHF antenna of claim 1, wherein the dielectric ceramic composition is in the form of a monolithic ceramic component.

5. A dielectric ceramic composition having a dielectric constant, K, of at least 200 and a dielectric loss, DF, of 0.0006 or less at 1 MHz, and having a major component of 92.49 to 97.5 wt. % containing 60.15 to 66.80 wt. % strontium titanate, 11.02 to 23.59 wt. % calcium titanate and 7.11 to 21.32 wt. % barium titanate; and a minor component of 2.50 to 7.51 wt. % containing 1.18 to 3.55 wt. % calcium zirconate, 0.50 to 1.54 wt. % bismuth trioxide, 0.2 to 0.59 wt. % zirconia, 0.02 to 0.07 wt. % manganese dioxide, 0.12 to 0.35 wt. % zinc oxide, 0.12 to 0.35 wt. % lead-free glass frit, 0.24 to 0.71 wt. % kaolin clay and 0.12 to 0.35 wt. % cerium oxide.

6. A broad band UHF antenna comprised of the dielectric ceramic composition of claim 5.

7. An electronic device comprised of the broad band UHF antenna of claim 6.

8. A monolithic ceramic component comprised of the dielectric ceramic composition of claim 5.

9. A ceramic dielectric material consisting essentially of a major component of 92.49 to 97.5 wt. % containing 60.15 to 66.80 wt. %

10. The ceramic dielectric material of claim 9 wherein the dielectric ceramic material is formed into a sintered body by firing.

11. A broad band UHF antenna comprised of the ceramic dielectric material of claim 9 sintered into a substrate.

12. An electronic device comprised of the broad band UHF antenna of claim 11.

13. A method of manufacturing, comprising: providing a ceramic dielectric material consisting essentially of a major component of 92.49 to 97.5 wt. % containing 60.15 to 66.80 wt. % strontium titanate, 11.02 to 23.59 wt. % calcium titanate and 7.11 to 21.32 wt. % barium titanate, and a minor component of 2.50 to 7.51 wt. % containing 1.18 to 3.55 wt. % calcium zirconate, 0.50 to 1.54 wt. % bismuth trioxide, 0.2 to 0.59 wt. % zirconia, 0.02 to 0.07 wt. % manganese dioxide, 0.12 to 0.35 wt. % zinc oxide, 0.12 to 0.35 wt. % lead-free glass frit, 0.24 to 0.71 wt. % kaolin clay and 0.12 to 0.35 wt. % cerium oxide; and firing the ceramic dielectric material.

14. The method of claim 13 wherein the step of firing the ceramic dielectric material is firing the ceramic dielectric material to sinter into a substrate.

15. The method of claim 14 wherein the substrate is associated with a UHF broadband antenna.

16. The method of claim 13 wherein the dielectric ceramic composition having a dielectric constant, K, of at least 200 and a dielectric loss, DF, of 0.0006 or less at 1 MHz.

17. The method of claim 13 wherein the dielectric ceramic composition having a dielectric constant, K, of at least 300 and a dielectric loss, DF, of 0.0005 or less at 1 MHz.

18. The method of claim 13 further comprising forming a monolithic ceramic component from the ceramic dielectric material.

19. The method of claim 13 wherein the step of firing the ceramic dielectric material includes firing the ceramic dielectric material to form a sintered body.

20. A dielectric ceramic composition, comprising: 60.15 to 66.80 wt. % strontium titanate, 11.02 to 23.59 wt. % calcium titanate, 7.11 to 21.32 wt. % barium titanate, 1.18 to 3.55 wt. % calcium zirconate, 0.50 to 1.54 wt.

21. A broad band UHF antenna comprised of the dielectric ceramic composition of claim 20.

22. An electronic device comprised of the broad band UHF antenna of claim 21.

* * * * *

UNITED STATES PATENT AND TRADEMARK OFFICE
CERTIFICATE OF CORRECTION

PATENT NO. : 7,907,090 B2
APPLICATION NO. : 11/759523
DATED : March 15, 2011
INVENTOR(S) : Bershadsky et al.

It is certified that error appears in the above-identified patent and that said Letters Patent is hereby corrected as shown below:

IN THE CLAIMS

In claim 9, at column 4, line 44, after the word "66.80 wt." insert --% strontium titanate, 11.02 to 23.59 wt. % calcium titanate and 7.11 to 21.32 wt. % barium titanate; and a minor component of 2.50 to 7.51 wt. % containing 1.18 to 3.55 wt. % calcium zirconate, 0.50 to 1.54 wt. % bismuth trioxide, 0.2 to 0.59 wt. % zirconia, 0.02 to 0.07 wt. % manganese dioxide, 0.12 to 0.35 wt. % zinc oxide, 0.12 to 0.35 wt. % lead-free glass frit, 0.24 to 0.71 wt. % kaolin clay and 0.12 to 0.35 wt. % cerium oxide.--

In claim 20, at column 6, line 4, after the word "1.54wt." insert --% bismuth trioxide, 0.2 to 0.59 wt. % zirconia, 0.02 to 0.07 wt. % manganese dioxide, 0.12 to 0.35 wt. % zinc oxide, 0.12 to 0.35 wt. % lead-free glass frit, 0.24 to 0.71 wt. % kaolin clay and 0.12 to 0.35 wt. % cerium oxide.--

Signed and Sealed this
Fourteenth Day of June, 2011

David J. Kappos
*Director of the United States Patent and Trademark Office*